(12) United States Patent
Cherukuri

(10) Patent No.: US 6,267,811 B1
(45) Date of Patent: *Jul. 31, 2001

(54) TALC SLURRY DISPERSION

(75) Inventor: Suresh B. Cherukuri, Wisconsin Rapids, WI (US)

(73) Assignee: Stora Enso North America Corp., Wisconsin Rapids, WI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,489

(22) Filed: Dec. 21, 1998

(51) Int. Cl.$^7$ .............................. C09C 1/00; C09C 1/02; C09C 1/28

(52) U.S. Cl. .................... 106/469; 106/401; 106/461; 106/466

(58) Field of Search .................... 106/469, 466, 106/461, 401

(56) References Cited

U.S. PATENT DOCUMENTS

| | | | |
|---|---|---|---|
| 2,440,601 | 4/1948 | Dickerman | 106/308 |
| 3,455,715 | 7/1969 | Nillo-Rama | 106/214 |
| 4,187,192 | 2/1980 | Sheridan | 252/313 R |
| 4,391,647 | 7/1983 | Deer | 106/109 |
| 4,430,249 | * 2/1984 | Gate | 252/313 |
| 4,938,983 | * 7/1990 | Peignier et al. | 426/573 |
| 5,076,846 | 12/1991 | Buri | 106/401 |
| 5,120,365 | 6/1992 | Kogler | 106/415 |
| 5,238,881 | 8/1993 | Norris | 501/20 |
| 5,421,870 | 6/1995 | Scartazzini | 106/21 |
| 5,458,679 | * 10/1995 | Fairchild | 106/465 |
| 5,472,485 | * 12/1995 | Pandian et al. | 106/194 |
| 5,512,616 | 4/1996 | Podlas | 524/18 |

OTHER PUBLICATIONS

Hawley's Condensed Chemical Dictionary, Eleventh Edition; p. 224–225 No Date.
Polacryl A40–43S Specification Sheets, Nov. 1996.
Allied Colloids, Inc, DIPEX N40V Specification Sheet; 1997.
Metsa–Serla Corp., Memo from Ilkka Tamminen regarding "Dispersing of Talc"; Jun., 1996.
R.T. Vanderbilt Company, Inc. Specification Sheets indicating "one ton of VANTALC 6H yields 330 gallons of slurry at 50% solids"; 1996.
Kelco, Division of Merck & Co. Inc. Bulletin DB 25 Dispersible Xanthan Gum, Product Specification Sheet for Kelsan S xanthan gum ; 1991.

* cited by examiner

*Primary Examiner*—Mark L. Bell
*Assistant Examiner*—Michael J. DiVerdi
(74) *Attorney, Agent, or Firm*—Greer, Burns & Crain, Ltd.

(57) ABSTRACT

An aqueous talc slurry that exhibits minimal foaming comprises talc pigment, a carboxymethyl cellulose (CMC) wetting agent having a molecular weight of between 50,000 and 150,000, an ionic polyacrylate dispersing agent, and has a solids content of between 55% and 65%. The slurry has an entrained air content of less than about 1% as measured after at least several minutes of low shear agitation. A method of preparing a talc slurry that exhibits minimal foaming comprises the sequential steps of mixing CMC wetting agent with water, adding an ionic polyacrylate dispersing agent, and dispersing talc to result in a solids content of between 55% and 65%. The resultant slurry has an entrained air content of less than 1% as measured after at least 30 minutes of low shear mixing. An aqueous talc slurry containing a small amount of xanthan gum stabilizing agent is stable for prolonged periods.

20 Claims, No Drawings

TALC SLURRY DISPERSION

BACKGROUND OF THE INVENTION

The present application relates to talc slurries that exhibit minimal foaming.

Talc is a mineral used in the paper making and coating arts. More specifically, talc has been used as a filler in base sheets, and as a pigment in enamel coating of papers. It is advantageous to the paper maker to receive talc in the form of a pumpable, aqueous slurry, in that it greatly simplifies the handling of the mineral.

In conventional practice the mineral processor mines the talc and suspends it in water. Talc pigment is highly hydrophobic with a surface energy of 68–70 $j/cm^2$. This low surface energy makes talc difficult to disperse in water. Relatively large amounts of nonionic polymers must be used as wetting agents in combination with other dispersing agents to adequately disperse the talc. The relatively large amounts of these surface active agents present in the talc slurry disadvantageously lead to excessive foaming of the slurry. Foaming clogs screening, coating application mechanisms, and otherwise makes the handling of the slurry very difficult and impractical.

Accordingly, there is an unresolved need for a talc slurry that does not foam excessively.

OBJECTS OF THE INVENTION

It is an object of the invention to provide a talc slurry that is resistant to foaming, and a method for making the same.

It is a further object of the invention to provide a stable talc slurry and a method for stabilizing a slurry so as to maintain talc particles in suspension for extended periods of time.

SUMMARY OF THE INVENTION

The present invention generally comprises an aqueous talc slurry with a carboxymethyl cellulose (CMC) wetting agent. The present invention further comprises a method of making a talc slurry using CMC as a wetting agent. Use of CMC as a wetting agent eliminates the foaming problems associated with prior art slurries.

A preferred embodiment of the aqueous talc slurry of the invention comprises between approximately 0.5 and 0.8 parts CMC wetting agent by weight per 100 parts dry talc. The preferred slurry further comprises at least one dispersing agent, preferably between 0.15 and 0.25 parts sodium polyacrylate by weight per 100 parts dry talc. The pH of the slurry is preferably adjusted to between 9 and 11 prior to addition of the dispersing agent; between 0.03 and 0.06 parts NaOH per 100 parts dry talc will result in this pH level. The solids content of the slurry is between approximately 55% and 65%, and the slurry viscosity is less than 100 centipoise.

The slurry of the invention has been found to have an entrained air content of less than 4% after mixing during its preparation; and preferably of less than 1%. Entrained air content will be even less should the slurry be allowed to de-aerate. Such a low entrained air content results in minimal foaming, thereby allowing for the slurry of the invention to be easily screened and otherwise processed. The slurry of the invention may also advantageously be used in the wet end of paper making machine without significantly affecting the wet end charge balance.

Aqueous talc slurries are subject to quickly settling out. For prolonged stability, the talc slurry of the invention may further comprise a stabilizing agent. A small amount of xanthan gum has been found to extend the stability of the preferred slurry of the invention from a few days time to 3–4 weeks. A preferred concentration is between 0.03 and 0.08 parts by weight xanthan gum per 100 parts dry talc.

The present invention further comprises a method of preparing an aqueous talc slurry. The preferred method comprises the steps of first mixing between approximately 0.5 and 0.8 parts by weight CMC with 167 parts water with mixing at low shear for at least approximately 30 minutes. Between approximately 0.03 and 0.06 parts NaOH is next added to bring the pH to a level of about 10. This pH level has been found to benefit the wetting of the talc pigment. The next step comprises the addition of between approximately 0.15 and 0.25 parts sodium polyacrylate dispersing agent, followed by the step of dispersing approximately 100 parts dry talc into the mixture while at low shear mixing. After completing addition of the talc, the mixing rate is increased to high shear for at least approximately 30 minutes.

To prolong the stability of the slurry, the preferred method of preparation further comprises adding between approximately 0.03 and 0.08 parts xanthan gum stabilizing agent by weight per 100 parts dry talc.

The preferred method of preparation of an aqueous talc slurry of the invention results in a slurry having an entrained air content of less than 1% after mixing during preparation. Such a low content insures minimal foaming, so that the slurry prepared by the method of the invention can be readily screened and otherwise processed.

The above brief description sets forth rather broadly the more important features of the present disclosure so that the detailed description and examples that follow may be better understood, and so that the present contributions to the art may be better appreciated. There are, of course, additional features of the disclosure that will be described hereinafter which will form the subject matter of the claims appended hereto. In this respect, before explaining the examples of the disclosure in detail, it is to be understood that the disclosure is not limited in its application to the details of the compositions and methods set forth in the following description. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

The aqueous talc slurry of the invention comprises carboxymethyl cellulose (CMC) wetting agent. A CMC wetting agent has been found to eliminate the foaming problem associated with aqueous talc slurries that has been heretofor unresolved.

Not all CMC's are useful as wetting agents. High molecular weight CMC yields less surface area per unit weight but is effective in separating the individual talc particles, resulting in generally good dispersant properties but bad wetting properties. A slurry prepared with CMC of too high a molecular weight will be overly viscous. Lower molecular weight CMC is very effective in wetting the talc, but is less effective as a dispersant. A slurry prepared with a CMC of too low a molecular weight will result in a slurry of poor talc suspension. A preferred molecular weight range of CMC for the slurry of the present invention has been found to be between approximately 50,000 and 150,000. A most preferred CMC molecular weight is approximately 80,000;

CMC of this weight is commercially available under a Finnfix-30 trade name from Metsa Specialty Chemicals OY, Aonekoski, Finland. A useful composition range for CMC in the talc slurry of the invention is between 0.2 and 2 parts by weight per 100 parts dry talc, with a preferred concentration range of 0.5 to 0.8 parts. The most preferred composition is 0.7 parts by weight per 100 parts dry talc.

The preferred slurry of the invention further comprises NaOH for its effect on the pH of the slurry. NaOH is added to adjust the pH of the slurry to a value of about 10 prior to addition of a dispersing agent. A useful concentration range for the slurry of the invention is between approximately 0.01 to 1 part by weight per 100 parts dry talc. In the preferred slurry, between 0.03 and 0.06 parts NaOH is present by weight per 100 parts talc, with a most preferred concentration of 0.05 parts. It is noted that NaOH presence is not required in the slurry of the invention; the presence of the talc alone, for instance, is known to result in an alkaline solution. Also, alkaline materials other than NaOH as are known in the art may be used to adjust the pH to the desired level.

The slurry of the invention also preferably comprises a dispersing agent to aid in the distribution of the talc. Any commercially available anionic polyacrylate is useful, with a sodium polyacrylate dispersant preferred, commercially available as Polacryl a40-43S from the Polacryl Corp., Stamford, Conn. A useful dispersing agent concentration for the slurry of the invention is between approximately 0.1 and 0.4 parts by weight ionic polyacrylate per 100 parts dry talc, with between approximately 0.15 and 0.25 parts preferred, and 0.2 parts most preferred. An alternate dispersant is commercially available as Dispex N-40, with the Polacryl a40-43 S preferred because of its temperature capabilities.

The preferred slurry of the invention further comprises water in an amount sufficient to yield a solids content in a useful range of between approximately 58% and 64%, with a range of 58% to 62% preferred, and 60% most preferred. Solids content refers to the concentration of all materials present in the slurry that are not water, and may be determined by drying all of the water from the slurry in an oven and weighing remaining solids.

The preferred slurry of the invention has been found to be stable for a period of a few days. After this time, the suspended talc pigment begins to settle out and the slurry becomes un-pumpable. If stability is required for a longer period, the slurry may further comprise a small amount of stabilizing agent. The preferred stabilizing agent is xanthan gum commercially available as Kelzan-S supplied by the Kelco-Division of Merck & Co, San Diego, Calif. A useful concentration of the xanthan gum is between approximately 0.01 and 0.2 parts by weight per 100 parts dry talc, with between 0.03 and 0.08 parts preferred, and 0.05 parts most preferred. It is noted that introduction of solid xanthan gum, as opposed to dissolved xanthan gum in solution, into a talc slurry may result in clumping of the talc pigment. For this reason, it is preferable to prepare a xanthan gum solution for introduction to the slurry. For instance, a 2% solution in water may be prepared. In preparing the 2% solution, a small amount of NaOH may be useful to dissolve the xanthan gum. It is further noted that presence of xanthan gum stabilizing agent makes the slurry of the invention prone to bacterial growth.

Table 1 summarizes the composition of the preferred slurry of the invention.

TABLE 1

Talc Slurry Composition

| Material: | Useful Parts Range (by dry weight per 100 parts Talc): | Preferred Parts Range (dry weight per 100 parts Talc): | Most Preferred parts (dry weight per 100 parts talc): |
| --- | --- | --- | --- |
| CMC | 0.2–2 | 0.5–0.8 | 0.7 |
| NaOH | 0.01–1 | 0.03–0.06 | 0.05 |
| Dispersing agent | 0.1–0.4 | 0.15–0.25 | 0.2 |
| Total Solids: | 58%–64% | 58%–62% | 60% |
| | | For Stabilization: | |
| Xanthan Gum | 0–.2 | 0.03–0.08 | 0.05 |

The preferred slurry of the invention has an entrained air content of less than 1% as measured after agitation at low shear for at least 30 minutes during preparation. This low level of entrained air insures minimal foaming. This allows for the slurry of the invention to be screened much faster than talc slurries of the prior art, and for significant improvement in other slurry processing steps that are otherwise hampered by foaming. The slurry of the invention may also advantageously be used in the wet end of a paper making machine without significantly affecting the wet end charge balance.

The preferred slurry of the invention also has a viscosity of less than 100 centipoise before the addition of stabilizing agent. Upon addition of a stabilizing agent, viscosity will rise considerably. If the most preferred amount of xanthan gum stabilizing agent is added, for example, viscosity will rise to a level of less than 500 centipoise, preferably about 350 centipoise. These viscosity levels are within an acceptable range for slurry screening and other handling operations of the slurry.

The mechanism by which CMC can function as a wetting agent and yet not tend to foam is not completely understood at present. It is theorized that CMC adheres to the surface of talc pigment and does not leave a second functional group for attaching to a water. The present invention further comprises a method of preparing an aqueous talc slurry. The preferred method of preparing an aqueous talc slurry of the invention comprises the first step of preparing a mixture by mixing CMC with approximately 168 parts by weight water. The preferred CMC has a molecular weight between 50,000 and 150,000; with a most preferred molecular weight of approximately 80,000. Such CMC is commercially available as Finnfix-30 @ 93% from the Metsa Specialty Chemicals Co. A useful amount of CMC comprises between 0.2 and 2 parts by weight of CMC, with between 0.5 and 0.8 parts preferred and 0.7 parts most preferred. The CMC is preferably added to the water slowly while under low shear agitation. Mixing is continued for at least 30 minutes after the completion of CMC addition.

The second step of the preferred method of the invention comprises adjusting the pH of the mixture to between approximately 9 and 11, with a pH of 10 most preferred. This level of pH has been found to be beneficial for wetting of the talc. This may be accomplished by addition of NaOH. Between 0.03 and 0.06 parts by weight of NaOH should be sufficient, with 0.05 parts most preferred. It is noted that other alkaline materials may be used to adjust the pH as may be known in the art.

The next sequential step of the method of the invention comprises adding a dispersing agent to the mixture for good dispersion of the talc pigment. The dispersant preferably comprises a sodium polyacrylate such as that commercially available under the Polacryl a40-43S trade name from the Polacryl corp., Stamford, Conn. A useful amount of the dispersant to be added comprises between 0.1 and 0.4 parts by weight, with between 0.15 and 0.25 parts preferred and 0.2 parts most preferred. An alternate dispersant is commercially available as Dispex N-40, with the Polacryl a40-43S preferred because of its temperature capabilities.

The next sequential step of the method of the invention is to disperse the talc pigment in the mixture. The talc should be added slowly without clumping while under low shear mixing. Preferably, between 95 and 105 parts of dry talc are added, with 100 parts most preferred. Upon completion of the talc addition, shear may be increased and continued for at least several minutes, with at least 30 minutes preferred.

Should the slurry be required to remain stable for longer than 2–3 days, the method of the invention further comprises an additional step of adding a stabilizing agent. A preferred stabilizing agent comprises xanthan gum as commercially available under the Kelzan-S trade name supplied by the Kelco-Division of Merck & Co, San Diego, Calif. A useful amount of xanthan gum to be added comprises between approximately 0.01 and 0.2 parts by weight, with between 0.03 and 0.08 parts preferred, and 0.05 parts most preferred. It is preferred to introduce the xanthan gum in solution form, as it has been discovered that introduction of solid xanthan gum can cause clumping with the talc pigment. In preparing a xanthan gum solution, a small amount of NaOH may be useful to dissolve the xanthan gum.

Also, the amount of water in the talc slurry solution should total approximately 168 parts per 100 parts dry talc. The amount of water to start the slurry preparation may be adjusted to include water that will be carried by dilute materials to be added later. For instance, addition of 10 gm of 20% NaOH will carry 8 gm of water.

EXAMPLES

Example 1

A slurry was prepared with the following composition:

TABLE 2(a)

Example 1 Kelzan-S 2% Solution

| Addition Seg.: | Material: | Dry Parts (by weight): | Wet Parts (by weight): |
|---|---|---|---|
| 1 | Water | — | 97.9 |
| 2 | Kelzan-S @ 96% | 2.0 | 2.1 |
| 3 | NaOH @ 20% | 0.008 | 0.04 |

TABLE 2b

Example 1 Slurry

| Material: | Parts Wet[2] (by weight): | Parts Dry[3] (by weight): |
|---|---|---|
| Water | 168 | — |
| CMC (Finnfix-30 @ 93%) | .75 | 0.7 |
| NaOH(@ 20%) | 0.25 | 0.05 |
| Dispersant (Polacryl a40-43S @ 43%) | .47 | 0.20 |
| Talc @ 98% | 102 | 100 |
| Total Solids: | 60% | 60% |

TABLE 2b-continued

Example 1 Slurry

| Material: | Parts Wet[2] (by weight): | Parts Dry[3] (by weight): |
|---|---|---|
| For Stabilization: | | |
| Kelzan-S Solution @ 2% (from table 3(a)) | 2.5 | 0.05 |
| Total Solids | 59% | 59% |

[2]"Parts Wet" refers to material parts in their diluted form (e.g., for Finnfix 30, "parts wet" concentration is parts of 93% concentration material added)
[3]"Parts Dry" refers to material parts in their active, undiluted form (e.g, for Finnfix 30, "dry" parts equals "wet" parts multiplied by active concentration of 93%)

The resulting slurry was found to have an entrained air concentration of less than 1% after mixing during preparation.

Example 2

The process of the invention for preparing a slurry was used to prepare the slurry of example 1. Table 3(a) and 3(b) summarizer the steps of the process:

TABLE 3(a)

Process of Preparing Kelzan-S 2% Solution

| Step: | Description: | Dry Parts (by weight): | Wet Parts (by weight): |
|---|---|---|---|
| 1 | Water | — | 97.9 |
| 2 | Add Kelzan-S @ 96%, mix | 2.0 | 2.1 |
| 3 | Add NaOH @ 20%, mix | 0.008 | 0.04 |

TABLE 3(b)

Process of Preparing Slurry

| Step: | Description: | Parts Dry[4] (by weight): |
|---|---|---|
| 1 | Water | — |
| 2 | Add CMC (Finnfix-30 @ 93%) slowly, stir at low shear for 30 minutes | 0.7 |
| 3 | Add NaOH (@ 20%) to bring pH to 10, stir | 0.05 |
| 4 | Add Dispersant (Polacryl a40-43S @ 43%) | 0.20 |
| 5 | Add Talc (@ 98%) slowly without clumping while stirring at low shear; stir for additional 30 minutes at high shear after talc addition is complete | 100 |
| | Total Solids: | 60% |
| | For Stabilization: | |
| 6 | Add xanthan gum stabilizing agent (Kelzan-S Solution @ 2% from Table 1A), stir | 0.05 |
| | Total Solids | 59% |

[4]"Parts Dry" refers to material parts in their active, undiluted form (e.g., for Finnfix 30, "dry" parts equals "wet" parts multiplied by active concentration of 93%)

The process resulted in the preparation of a slurry with less than 1% entrained after agitation during preparation.

Example 3

A series of slurries were prepared to determine the effect on stability that would result from use of different molecular weight CMC's and different concentrations of Xanthan gum stabilizing agents. Table 4 summarizes the results of these experiments.

TABLE 4

Stability Examples

| | Kelzan-S (Xanthan Gum) Addition Level (parts per 100 parts dry talc) | | | | | | | | |
|---|---|---|---|---|---|---|---|---|---|
| | 0.05 | | | 0.075 | | | 0.1 | | |
| Type of CMC | T-Bar | Super-natant, mm | Sedi-ment, mm | T-Bar | Super-natant, mm | Sedi-ment, mm | T-Bar | Super-natant, mm | Sedi-ment, mm |
| Finnfix-5 | | | | | | | | | |
| 1 week | 14000 | n.m | n.m | 15100 | n.m | n.m | 17800 | n.m | n.m |
| 2 Week | 33800 | 4 | 2 | 38600 | 3 | 2 | 26700 | 0 | 2 |
| Finnfix-10 | | | | | | | | | |
| 1 Week | 14400 | n.m | n.m | 17400 | n.m | n.m | 19200 | n.m | n.m |
| 2 Week | 44600 | 3 | 2 | 40900 | 2 | 2 | 44600 | 0.5 | 2 |
| Finnfix-30 | | | | | | | | | |
| 1 Week | 34400 | n.m | n.m | 36600 | n.m | n.m | 42600 | n.m | n.m |
| 2 Week | 43300 | 0 | 0 | 45600 | 0 | 0 | 46800 | 0 | 0 |
| Finnfix-2000 | | | | | | | | | |
| 1 Week Finnfix-4000 | | | | Settled out after 1 week | | | | | |
| 1 Week | | | | Settled out after 3 days | | | | | |

In the above Table 4, "n.m." indicates that no measurement was taken. The experiments summarized in Table 4 indicate that CMC of a molecular weight of approximately 80,000 (as available under the Finnfix-30 trade name) is most advantageous. Likewise, the experiments show that addition of approximately 0.1 parts xanthan gum stabilizing agent per 100 parts dry talc is preferred.

The advantages of the disclosed invention are thus attained in an economical, practical, and facile manner. While preferred embodiments and examples have been shown and described, it is to be understood that various further modifications will be apparent to those skilled in the art. It is intended that the specific embodiments herein disclosed are illustrative of the preferred and best modes for practicing the invention, and should not be interpreted as limitations on the scope of the invention as defined by the appended claims.

What is claimed is:

1. A method of preparing an aqueous talc slurry consisting essentially of the steps of:
   a) making a mixture of carboxymethyl cellulose wetting agent and water;
   b) adjusting the pH of the mixture to between 9 and 11;
   c) adding a dispersing agent to the mixture; and
   d) dispersing talc pigment in the mixture to form a slurry; the slurry having an entrained air content of less than 4% as measured after at least 30 minutes of mixing a low shear, and the slurry having solids content of at least about 58% solids.

2. A method as in claim 1, wherein said slurry having an air content of less than 1% as measured after at least 30 minutes of mixing at low shear.

3. A method as in claim 1, wherein said carboxymethyl cellulose wetting agent has a molecular weight between approximately 50,000 and 150,000.

4. A method as in claim 1, wherein the quantity of said carlboxymetyl cellulose wetting agent in the slurry is between 0.2 and 2.0 parts by dry weight per 100 parts of talc.

5. A method as in claim 1, wherein the quantity of said carboxymethyl cellulose wetting agent in the slurry is between 0.5 and 0.8 parts by dry weight per 100 parts of talc.

6. A method as in claim 1, wherein the quantity of said dispersing agent in the slurry is between 0.01 and 0.4 parts by dry weight per 100 parts talc.

7. A method as in claim 1, wherein the quantity of said dispersing agent in the slurry is between 0.15 and 0.25 parts by dry weight per 100 parts talc.

8. A method as in claim 1, wherein said slurry has a viscosity of less than 100 centipoise.

9. A method of preparing a low viscosity, aqueous talc slurry, comprising the steps of;
   a) preparing an aqueous mixture of between approximately 0.2 and 2.0 parts by dry weight carboxymethyl cellulose per 100 parts talc and a sufficient quantity of water to yield a slurry having a solids content of between 58% and 64%;
   b) mixing between approximately 0.1 and 0.4 parts dispersing agent per 100 parts of talc into the aqueous mixture;
   c) dispersing 100 parts dry talc into said aqueous dispersion; and
   d) mixing the slurry without addition of adhesives or stabilizers to form a high solids, low viscosity talc slurry.

10. The method as in claim 9, further comprising the step of adjusting the pH of the aqueous mixture to between 9 and 11 prior to the addition of the dispersing agent.

11. The method as in claim 9, wherein said slurry has a viscosity of less than 100 centipoise.

12. The method of claim 9, wherein said slurry has an entrained air content of less than 4%.

13. A method of preparing a low viscosity, aqueous talc slurry that exhibits minimal foaming, comprising the steps of:

a) preparing a mixture of between approximately 0.5 and 0.8 parts by dry weight carboxymethyl cellulose per 100 parts of talc and a sufficient quantity of water to form a talc slurry having a solids content of between 58% and 62%;

b) adjusting the pH of said mixture to between 9–11;

c) mixing between approximately 0.15 and 0.25 parts dispersing agent into said mixture;

d) slowly dispersing approximately 100 parts dry talc into said mixture while mixing at low shear; and e) mixing the slurry at a higher shear rate without addition of adhesives or stabilizers to form a high solids, low viscosity talc slurry that exhibits minimal foaming.

14. A method as in claim 13, wherein said slurry has an entrained air content of less than 1%.

15. An aqueous talc slurry comprising:

a) talc pigment;

b) between approximately 0.5 and 0.8 parts by dry weight carboxymethyl cellulose wetting agent per 100 parts of talc, said carboxymethyl cellulose wetting agent having a molecular weight of between approximately 50,000 and 150,000;

c) between approximately 0.15 and 0.25 parts by day weight polyacrylate dispersing agent per 100 parts dry talc;

d) the aqueous slurry having a solids content of 58–64%; and e) the aqueous slurry being free of binders and stabilizing agents.

16. An aqueous talc slurry as in claim 15 wherein said slurry has a viscosity of less than 100 centipoise.

17. An aqueous talc slurry as in claim 15 wherein said slurry has an entrained air content of less than 1% after 30 minutes of low shear mixing.

18. An aqueous talc slurry as in claim 15 further comprising between 0.03 and 0.06 parts by dry weight of NaOH per 100 parts of talc.

19. An aqueous talc slurry consisting essentially of:

a) talc pigment;

b) between approximately 0.2 and 2.0 parts by dry weight carboxymethyl cellulose wetting agent per 100 parts of talc;

c) between approximately 0.03 and 0.06 parts by dry weight NaOH per 100 parts of talc; and d) between approximately 0.01 and 0.4 parts by dry weight dispersing agent per 100 parts dry talc.

20. An aqueous talc slurry consisting essentially of:

a) talc pigment;

b) between approximately 0.2 and 2.0 parts by dry weight carboxymnethyl cellulose wetting agent per 100 parts of talc;

c) between approximately 0.03 and 0.06 parts by dry weight NaOH per 100 parts of talc;

d) between approximately 0.01 and 0.4 parts by dry weight dispersing agent per 100 parts dry talc; and e) between approximately 0.03 and 0.08 parts by dry weight xanthan gum per 100 parts talc.

* * * * *